C. W. DAKE.
MACHINE FOR MAKING BUCKETS FOR TURBINES.
APPLICATION FILED FEB. 13, 1911.

1,035,545.

Patented Aug. 13, 1912.
2 SHEETS—SHEET 1.

WITNESSES:
Mary Schulte
Mary S. Tooker

INVENTOR.
Charles W Dake.
BY
Wilson, Wilson & Rece
ATTORNEYS.

C. W. DAKE.
MACHINE FOR MAKING BUCKETS FOR TURBINES.
APPLICATION FILED FEB. 13, 1911.

1,035,545.

Patented Aug. 13, 1912.
2 SHEETS—SHEET 2.

WITNESSES:
Mary Schulte
Mary S. Tooker

INVENTOR.
Charles W. Dake.
BY
Wilson Wilson & Rice
ATTORNEY.

UNITED STATES PATENT OFFICE.

CHARLES W. DAKE, OF GRAND RAPIDS, MICHIGAN, ASSIGNOR TO PYLE-NATIONAL ELECTRIC HEADLIGHT COMPANY, OF CHICAGO, ILLINOIS, A CORPORATION OF NEW JERSEY.

MACHINE FOR MAKING BUCKETS FOR TURBINES.

1,035,545.  Specification of Letters Patent.  Patented Aug. 13, 1912.

Application filed February 13, 1911. Serial No. 608,331.

*To all whom it may concern:*

Be it known that I, CHARLES W. DAKE, a citizen of the United States, residing at the city of Grand Rapids, in the county of Kent and State of Michigan, have invented new and useful Improvements in Machines for Making Buckets for Turbines, of which the following is a specification.

Figure 2:
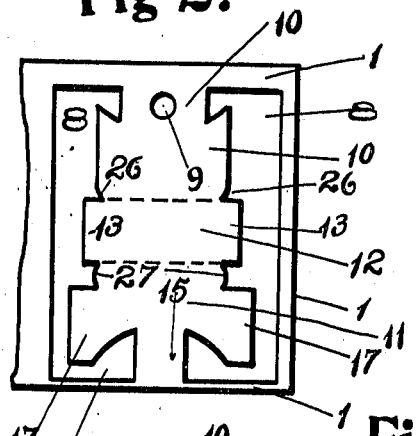
Figure 1:
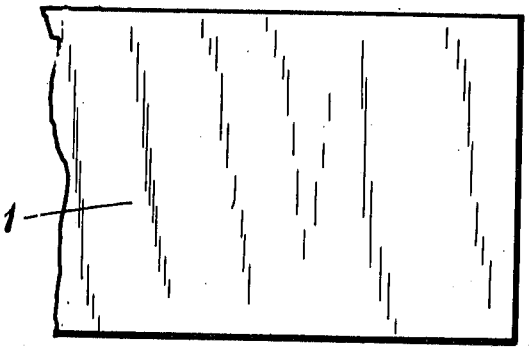
Figure 3:
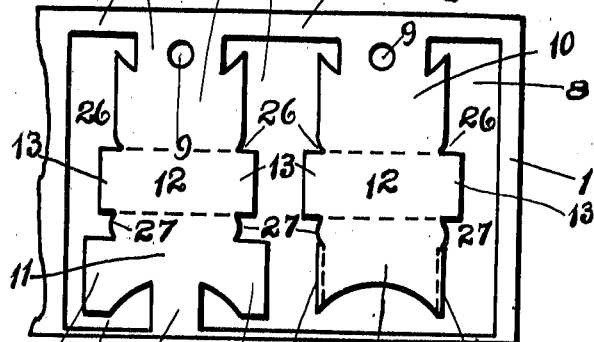
Figure 5:
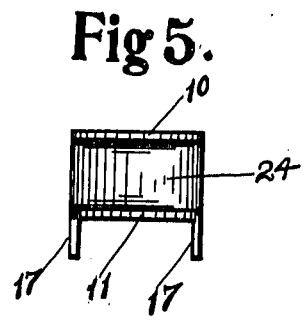
Figure 4:
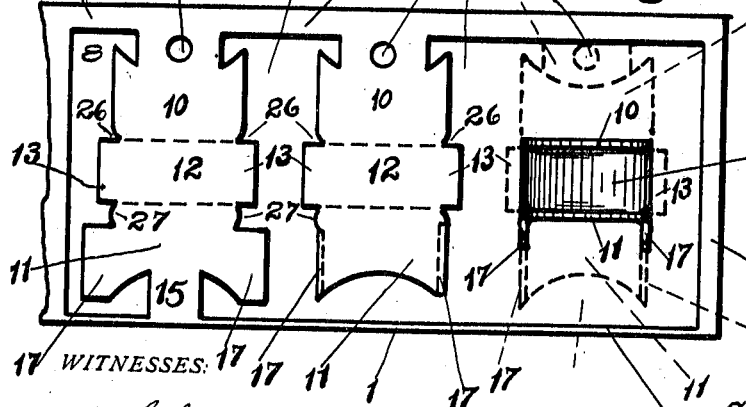
Figure 6:
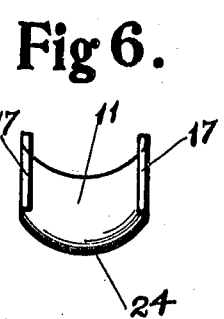
Figure 7:
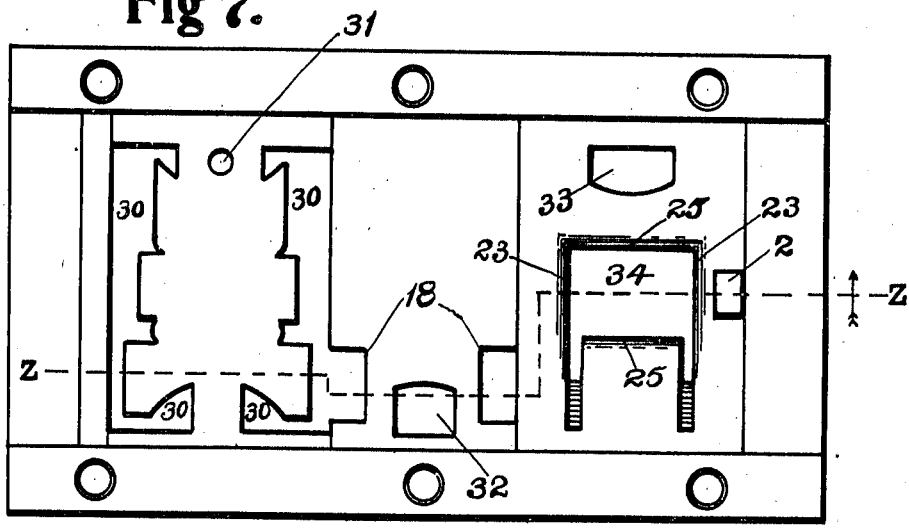
Figure 8:
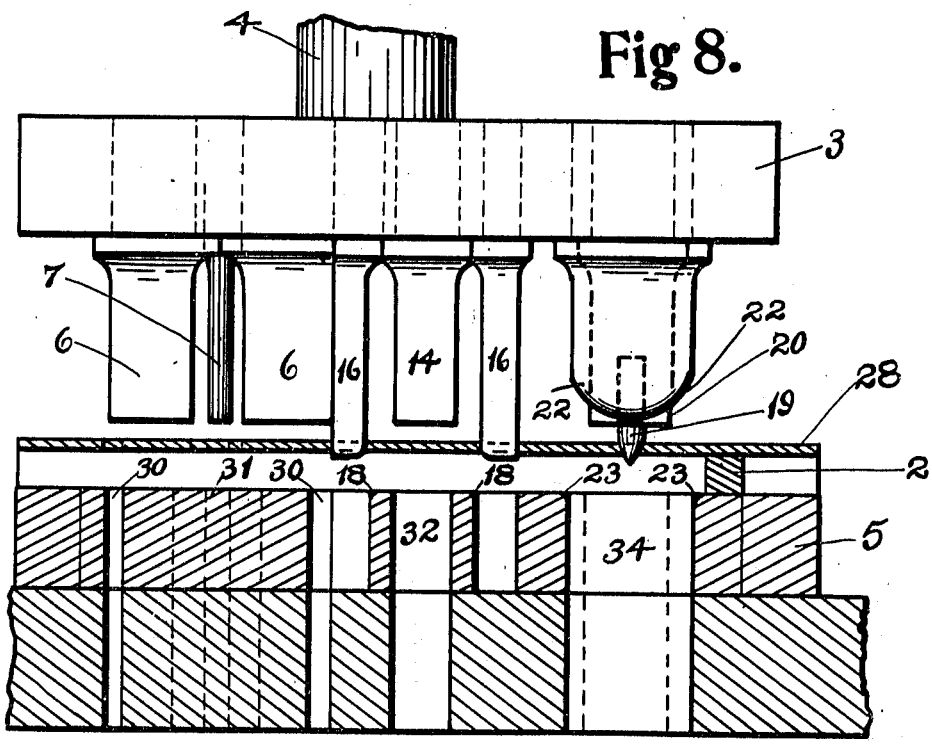

My present invention relates to machines for making buckets for turbines, and its object is to provide improved punches and coöperating parts for cutting and forming such buckets. This object is attained by, and my present invention is preferably embodied in, the following described mechanism, illustrated by the accompanying drawings, in which:

Figure 1 shows a portion of a strip of sheet metal from which the buckets are to be cut and formed: Fig. 2 represents the same after the first cutting operation has been performed: Fig. 3 represents the same, showing on its right hand side the further formation of the same bucket after the second operation has been performed, and showing on its left hand side the first cutting (as shown in Fig. 2) to form another bucket: Fig. 4 represents the same, showing at its right hand side the complete formation of the first bucket after the performance of the third operation thereon, and showing in its middle portion the second operation (as shown on the right of Fig. 3) to form another bucket, and further showing on its left hand portion the first cutting (shown in Fig. 2 and on the left of Fig. 3) to form a third bucket: Fig. 5 is a rear view of a completed bucket looking toward the concave inner side of its curved front wall: Fig. 6 is a bottom plan view of the same: Fig. 7 is a top plan view of the stationary die portion of my machine: and Fig. 8 is a front view of my machine, the stationary parts thereof being shown in vertical section on the line Z—Z of Fig. 7.

In the machine illustrated, three operations complete the bucket, and three buckets are being formed at each motion of the machine. A strip 1 of proper material, of suitable width and thickness, is fed into the machine from the left of Figs. 7 and 8 until arrested by the stop 2. The entire movable or punch portion 3 of the machine is forced downward into its corresponding die or the stationary portion of my machine, by a reciprocating carrying plunger 4 (operated by suitable power), and performs simultaneously the three formative operations on three several buckets. The punches 6 and 7 (with coöperating dies having registering orifices 30 and 31) cut away the parts 8 and punch the hole 9, this being the first formative operation performed by the machine. The bucket blank has now the shape shown in Fig. 2, with outer and inner wall portions, 10 and 11 respectively, and a forward wall portion 12 with extensions 13. In the second formative operation, the punch 14 with its die portion (having the orifice 32) cuts away the part 15 while the forming punches 16 bend the extensions 17 downward over the edges 18 of their dies to form ears as particularly shown in Fig. 5 for attaching the buckets to their support. The blank now appears as in the center of Fig. 4: In the third and last formative operation of the machine to produce the completed bucket, the pilot pin 19 engages the hole 9 to secure the blank in its proper position, and thereupon the cutting punch 20 with coöperating die having the orifice 33, cuts away the part 21 and the blank is thus severed from the strip 1; the forming punch 22, having a curved face as shown, bends the forward wall portion 12 downward between the edges 23 of its die having the orifice 34, to form, together with the extensions 13, the curved forward wall 24 of the bucket, and also bends the end portions 10 and 11 upward between the edges 25 of said die.

Slight indentations 26 and 27 cut between the portion 12 and the portions 10 and 11 respectively of the blank permit the more perfect joining of these portions when the blank is bent in the last operation.

A suitable plate 28 through which the punches pass serves to disengage the blanks from them.

Not confining myself to the details of construction shown and described, I claim:

1. In a machine of the character described, a die provided with oppositely-disposed openings similarly shaped in plan view and oppositely faced, the internal wall of each opening having in its middle part a recessed portion extending outwardly toward the side of the die, and at one end a second recessed portion extending outwardly toward the side of the die, and at one side of the first recessed portion an extension toward the middle of the die, and coöperating cutting punches faced correspondingly to said openings.

2. In a machine of the character described, a die provided with oppositely-disposed openings similarly shaped in plan view and oppositely faced, the internal wall of each opening having in its middle part a recessed portion extending outwardly toward the side of the die, and at one end a second recessed portion extending outwardly toward the side of the die, and coöperating cutting punches faced correspondingly to said openings, said die being provided also with a third opening 31, and a coöperating cutting punch 7.

3. In a machine of the character described, a die provided with oppositely-disposed openings similarly shaped in plan view and oppositely faced, the internal wall of each opening having in its middle part a recessed portion extending outwardly toward the side of the die, and at one end a second recessed portion extending outwardly toward the side of the die, and coöperating cutting punches faced correspondingly to said openings; and a second die provided with oppositely-disposed openings similarly shaped in plan view and having edges 18, and coöperating forming punches 16, said second die being also provided with a third opening 32 and a coöperating cutting punch 14 faced correspondingly to said opening 32.

4. In a machine of the character described, a die provided with oppositely-disposed openings similarly shaped in plan view and oppositely faced, the internal wall of each opening having in its middle part a recessed portion extending outwardly toward the side of the die, and at one end a second recessed portion extending outwardly toward the side of the die, and coöperating cutting punches faced correspondingly to said openings; and a second die provided with oppositely-disposed openings similarly shaped in plan view and having edges 18, and coöperating forming punches 16, said second die being also provided with a third opening 32 and a coöperating cutting punch 14 faced correspondingly to said opening 32; and a third die provided with an opening 33 and a coöperating cutting punch 20 faced correspondingly to said opening 33, and also provided with an opening 34 and a coöperating forming punch 22.

5. In a machine of the character described, a die provided with oppositely-disposed openings similarly shaped in plan view and oppositely faced, the internal wall of each opening having in its middle part a recessed portion extending outwardly toward the side of the die, and at one end a second recessed portion extending outwardly toward the side of the die, and coöperating cutting punches faced correspondingly to said openings; and a second die provided with oppositely-disposed openings similarly shaped in plan view and having edges 18, and coöperating forming punches 16, said second die being also provided with a third opening 32 and a coöperating cutting punch 14 faced correspondingly to said opening 32; one of said dies being provided with another opening and a coöperating cutting punch faced correspondingly to such opening and adapted to punch a pilot hole in the work; and a third die provided with an opening 33 and a coöperating cutting punch 20 faced correspondingly to said opening 33, and also provided with an opening 34 and a coöperating forming punch 22, and a pilot pin 19 adapted to engage the pilot hole.

In testimony whereof I have hereunto set my hand in presence of two subscribing witnesses.

CHARLES W. DAKE.

Witnesses:
  MARY S. TOOKER,
  MARY SCHULTE.